UNITED STATES PATENT OFFICE

GEORGE E. DUNTON, OF NEW YORK, N. Y.

COMPOSITION FOR TREATING MOLDS USED IN THE ELECTROTYPING ART.

993,157.      Specification of Letters Patent.      Patented May 23, 1911.

No Drawing.      Application filed September 6, 1910. Serial No. 580,540.

*To all whom it may concern:*

Be it known that I, GEORGE E. DUNTON, residing at New York, county of New York, State of New York, a citizen of the United States, have invented certain new and useful Improvements in Composition for Treating Molds Used in the Electrotyping Art; and I do hereby declare the following to be a full, clear, and exact description of the invention, such as will enable others skilled in the art to which it pertains to make and use the same.

The material for forming molds used in the electrotyping art for the production of printing plates is commonly made of some substance such as beeswax, ozocerite wax or like material which contains an appreciable percentage of grease, oil or oily substance in their composition. When pressure is applied to the form or cut in making the impression in the mold, it causes the grease or oily substance to be forced out and appear on the face of the mold in the form of a thin coating or film, said coating or film is very troublesome and annoying to the electrotyper as it causes imperfect and faulty reproductions, especially in case where the so-called half tone illustrations are being made which are composed or made up of a collection of very fine points or dots. The black leads used in the art of electrotyping are amorphous and very hygroscopic, consequently when applied to the surface of the wax mold having thereon the film of grease, oil or oily substance the minute particles of lead attract and become impregnated with this grease, oil or oily substance, thus adhering to the surface of the wax mold and hold one particle to the other so far as the influence of the grease, oil or oily substance is manifest and preventing the surplus particles from being removed by any of the common operations by which these molds are now treated.

My invention relates to a new and useful composition for curing the above mentioned fault, adapted especially for use in connection with the black lead used in the so-called operation of polishing the surface of the wax molds, by rendering the black lead impervious to the action of the grease, oil or oily substance which is present upon the surface of the wax mold by incorporating the black lead with said composition, which permits all surplus particles of the black lead, which have not been actually retained by and have not adhered to the surface of the wax, being removed by any of the well known and commonly used methods of washing or pumping out the molds.

This composition of matter may be applied to the surface of the wax mold by hand, with a brush or mechanically by squirting it over the surface of the wax mold as with a pump through a hose and suitable nozzle.

The composition consists of the following ingredients in about the proportion stated:—

| | |
|---|---|
| Water | 1 gallon |
| Caustic soda | 1 ounce |
| Caustic potash | ½ ounce |
| Black lead | 2 pounds |
| Glycerin | 4 ounces |

In compounding the composition, I first provide a suitable receptacle and pour into the same one gallon of water, to this water I add four ounces of glycerin stirring the mixture until the glycerin has dissolved or mixed thoroughly with the water, I then stir in the two pounds of black lead adding the one ounce of caustic soda and the one-half ounce of caustic potash at the same time, stirring the whole until the two latter have dissolved when the mixture is ready for use.

If the composition is to be used by hand, with a brush, a shallow pan preferably lined with copper or lead is provided having two cleats of wood laid across the bottom on the inside to support the mold in a horizontal position, face up. The mixture may be poured directly into this shallow pan or tray or placed in any suitable receptacle, from which it may be dipped out with the brush used for spreading it over the surface of the wax mold.

If used in a machine, of which there are many suitable forms or types, the mixture is placed within the tank reservoir of the machine, the mold placed in the machine which is started and the mixture is pumped or squirted over the surface of the wax mold until the said surface has become polished. The surplus lead, that which has not actually come in contact with and adhered to the surface of the wax, is washed away.

I do not wish to confine myself to the exact proportion of each ingredient as stated, as they may be varied, and other combinations may be made to produce the same results and still come within the scope and spirit of my invention. I have specified two caustic alkalis on account of their energetic action and their solubility in methyl alcohol but some of the other salts, especially those of sodium and potassium, would produce practically the same results.

What I claim is:—

A composition for treating wax electrotype molds comprising water one gallon, caustic soda one ounce, caustic potash one-half ounce, black lead two pounds, and glycerin four ounces, substantially as described.

In testimony whereof, I have hereunto set my hand and affixed my signature in the presence of two witnesses.

GEORGE E. DUNTON.

Witnesses:
LEONARD H. WARREN,
WILEY WARE.

---

Correction in Letters Patent No. 993,157.

It is hereby certified that in Letters Patent No. 993,157, granted May 23, 1911, upon the application of George E. Dunton, of New York, N. Y., for an improvement in "Composition for Treating Molds Used in the Electrotyping Art," an error appears in the printed specification requiring correction as follows: Page 1, line 74, the word "Clycerin" should read *Glycerin;* and that the said Letters Patent should be read with this correction therein that the same may conform to the record of the case in the Patent Office.

Signed and sealed this 1st day of August, A. D., 1911.

[SEAL.]

E. B. MOORE,

*Commissioner of Patents.* tions may be made to produce the same results and still come within the scope and spirit of my invention. I have specified two caustic alkalis on account of their energetic action and their solubility in methyl alcohol but some of the other salts, especially those of sodium and potassium, would produce practically the same results.

What I claim is:—

A composition for treating wax electrotype molds comprising water one gallon, caustic soda one ounce, caustic potash one-half ounce, black lead two pounds, and glycerin four ounces, substantially as described.

In testimony whereof, I have hereunto set my hand and affixed my signature in the presence of two witnesses.

GEORGE E. DUNTON.

Witnesses:
LEONARD H. WARREN,
WILEY WARE.

---

Correction in Letters Patent No. 993,157.

It is hereby certified that in Letters Patent No. 993,157, granted May 23, 1911, upon the application of George E. Dunton, of New York, N. Y., for an improvement in "Composition for Treating Molds Used in the Electrotyping Art," an error appears in the printed specification requiring correction as follows: Page 1, line 74, the word "Clycerin" should read *Glycerin;* and that the said Letters Patent should be read with this correction therein that the same may conform to the record of the case in the Patent Office.

Signed and sealed this 1st day of August, A. D., 1911.

[SEAL.]

E. B. MOORE,

*Commissioner of Patents.*

It is hereby certified that in Letters Patent No. 993,157, granted May 23, 1911, upon the application of George E. Dunton, of New York, N. Y., for an improvement in "Composition for Treating Molds Used in the Electrotyping Art," an error appears in the printed specification requiring correction as follows: Page 1, line 74, the word "Clycerin" should read *Glycerin;* and that the said Letters Patent should be read with this correction therein that the same may conform to the record of the case in the Patent Office.

Signed and sealed this 1st day of August, A. D., 1911.

[SEAL.]

E. B. MOORE,

*Commissioner of Patents.*